(12) United States Patent  
Fredheim et al.

(10) Patent No.: US 8,540,788 B2  
(45) Date of Patent: Sep. 24, 2013

(54) SEPARATOR UNIT

(75) Inventors: Ame Olav Fredheim, Trondheim (NO); Lars Henrik Gjertsen, Trondheim (NO); Bernt Henning Rusten, Trondheim (NO); Trond Austrheim, Trondheim (NO); Cecilie Gotaas Johnsen, Trondheim (NO)

(73) Assignee: Statoil ASA, Stavanger (NO)

( * ) Notice: Subject to any disclaimer, the term of this patent is extended or adjusted under 35 U.S.C. 154(b) by 347 days.

(21) Appl. No.: 12/866,285

(22) PCT Filed: Feb. 6, 2009

(86) PCT No.: PCT/NO2009/000043  
§ 371 (c)(1),  
(2), (4) Date: Oct. 11, 2010

(87) PCT Pub. No.: WO2009/099339  
PCT Pub. Date: Aug. 13, 2009

(65) Prior Publication Data  
US 2011/0016835 A1 Jan. 27, 2011

(30) Foreign Application Priority Data  
Feb. 8, 2008 (NO) .................................. 20080719

(51) Int. Cl.  
*B01D 45/12* (2006.01)

(52) U.S. Cl.  
USPC .................. 55/337; 55/350; 55/396; 55/457; 55/476

(58) Field of Classification Search  
USPC ........................... 55/337, 350, 396, 457, 476  
See application file for complete search history.

(56) References Cited

U.S. PATENT DOCUMENTS  
5,083,435 A * 1/1992 Lin ................................ 60/280

FOREIGN PATENT DOCUMENTS

| EP | 0859368 A1 | 8/1998 |
|---|---|---|
| GB | 1491672 A | 11/1977 |
| JP | 2003210908 | 7/2003 |
| SU | 837369 A1 | 6/1981 |
| SU | 1445763 A1 | 12/1988 |
| WO | 2004/030793 A1 | 4/2004 |

* cited by examiner

*Primary Examiner* — Robert A Hopkins  
(74) *Attorney, Agent, or Firm* — Volpe and Koenig, P.C.

(57) ABSTRACT

Separation device or unit for separating liquid from an inlet flow which mainly contains gas, has a container or a pipe section with an outlet for gas from the container or the pipe section, an outlet for liquid from the container or pipe section and an inlet for the inlet flow to the container or pipe section. The device has a flow manifold arranged to receive and direct the inlet flow towards a porous pipe body extending towards the gas outlet and arranged to receive all or most of the inlet flow. Part of the flow is flowing through the tubular body to the gas outlet, while the remaining flow is flowing through the tubular body's porous wall, and an annular space including the volume between the tubular body and the container wall or pipe section is open for gas flow towards the gas outlet.

13 Claims, 2 Drawing Sheets

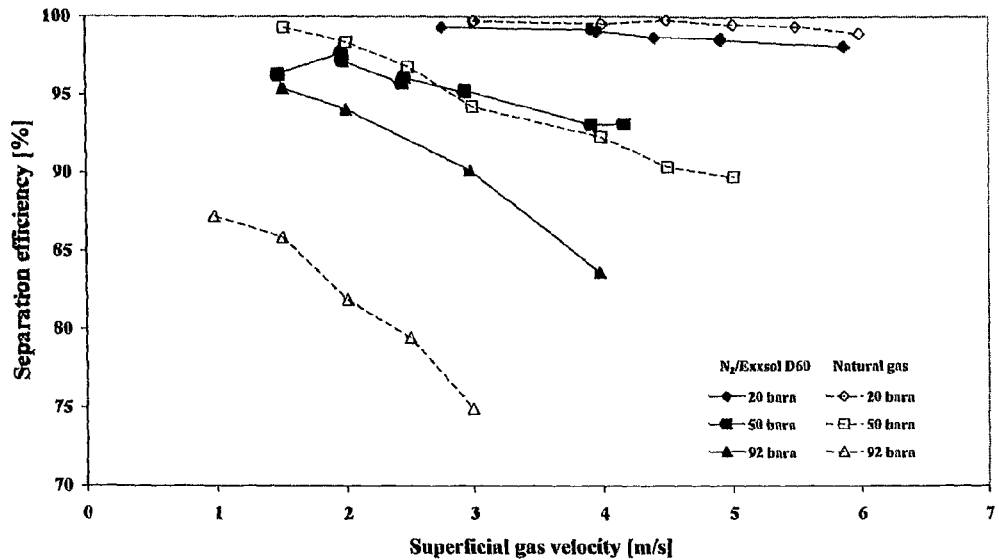
Figure 3 Cyclone separation efficiency for a generic axial flow cyclone at the liquid flow rate of 45 l/hr to the cyclone.
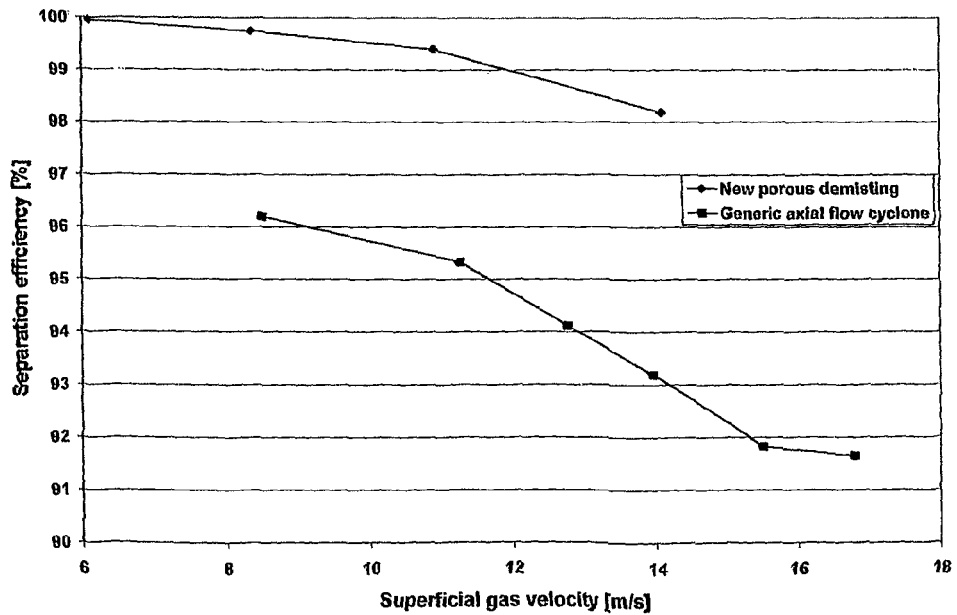
Figure 4 Comparison of generic axial flow cyclone and new porous demisting at liquid load of 0.022 – 0.030 vol%.

SEPARATOR UNIT

FIELD OF INVENTION

This invention relates to a separation of liquid from a flow which mainly contains gas. More specifically the invention relates to a separation device which in particular is adapted to separate the last fraction of liquid from a gas flow, also at high pressure and high flow rates.

BACKGROUND

A cyclone separator, sometimes referred to as centrifugal separator, works by putting a fluid in a rotational movement so that centripetal forces can operate in order to separate the fluid in a heavy part and a lighter part. The fluid will typically follow a helical phase and the heavy parts, phases or components will be collected at the outer peripheral of the helical path, while the lighter parts, phases or components will be collected along the longitudinal axes. In practical separation devices gravitational forces are often used together with a rotational movement, where heavy components can be drained or flowing down by means of gravitational forces, while lighter components may rise.

Centripetal force is the force that forces the fluid into a helical path. The centripetal force is proportional to the mass so that the phases or components will have difficulty in following the helical path, which explains why heavy components will be collected in the outer peripheral of the helical path. The centripetal force is however also proportional to the velocity in square, that being path speed in meter per second or angular speed. Higher speed provides a more efficient rotational movement and accordingly better separation. In connection with the above it is commonly recognized for a person skilled in the art that the separation efficiency increases with the flow rate. However, it has been shown that the separation efficiency sometimes is considerably reduced compared to the expected. The reduced separation efficiency is particularly evident at high pressure and high flow rates.

In the Soviet documents SU 1 445 763 A1 and SU 837369, there are however disclosed separation devices that partly solved the above problems in that separation devices where fluid can be filtered from a gas flow have been described. The filters are sleeve formed, there is no gas flow through the filters, the volume outside the filters is not open towards a gas discharge and the separation units appear to have only a narrow operating range in which the separation efficiency is particularly good.

Therefore there is a need in the art to provide a separation device with high separation efficiency in a wide range of operation conditions, including relatively high pressure and high flow rates.

SUMMARY

This need is obtained with the present invention provides a separation device for separation of liquid from an inflow that mainly contains gas, where the separation device comprises a container or a tubular section with an outlet for gas from the container or the tubular section, an outlet for liquid from the container or tubular section and an inlet for the inflow to the container or the tubular section, characterised in that the separation device further comprises:

a flow manifold arranged to receive and set the inflow in motion towards a porous tubular body extending towards the gas outlet and arranged to receive the entire or mainly the entire inflow, where a part of said flow is flowing through the tubular body to the gas outlet while the remaining of said flow is flowing through the porous wall of the tubular body, and an annular space consisting of the volume between the tubular body and the wall of the container or the tubular section, which annular space is open for gas flow towards to the gas outlet.

In one embodiment the flow manifold is a spin element and the container or tubular section is a vertical upright container. In particular, the separator device comprises of vertical upright container with circular cross section, an outlet for gas in the upper part of the container, an outlet for liquid in the lower part of the container and an inlet for the inlet flow or inflow. The separation device is further characterised in that comprising:

a spin element arranged to receive and put the inflow in a rotational movement around the vertical axes of the container, a porous tubular body extending towards the gas outlet, arranged to receive the whole and mainly the whole of the rotating inflow, where a part of said rotating flow is flowing through the tubular body to the gas outlet while the remaining of said rotating flow is flowing through the porous tubular wall, and an annular space consisting of the volume between the tubular body and the container wall, which annular space is open upward towards the gas outlet.

By a porous tubular body is meant a tubular section, that is, a tubular section where the tubular wall consists of a porous material with open porosity, so that the tubular wall is permeable for fluid. The porous material for the tubular wall can be chosen freely among many possible materials, such as metal foam, ceramic foam, bodies manufactured from wire or fiber of metal or ceramic material, or for example one of several materials used as catalytic carriers, provided that the operating conditions can be met, the through flow ability is sufficient and there is little or no internal surface where liquid film can be deposited on the inner wall of the porous tubular body. By the porous tubular body extending towards the gas outlet is arranged to receive the entire or mainly the entire inlet flow is meant that the entire inlet flow is introduced in the tubular body, or the entire inlet flow minus a small part (liquid) which can be collected at the flow manifold, where the flow manifold, for instance in the form of spin element, in itself can be a separation device, or some of the gas may be cycled outside the tubular body for some possible embodiments. By the annular space is open upward towards the gas outlet is meant that the annular space is not blocked for gas flow to the gas outlet, in contrast to the two previous mentioned Soviet patent documents.

The annular space has thus such a fluid path for gas arranged from the annular space to the gas outlet, where the annular space is completely open or mainly open towards the gas outlet so that gas is flowing through the wall of the tubular body. This is in contrast to the teaching in the previous mentioned Soviet documents. Consequently the separation device can comprise a demister such as a wired mat (wired mesh demister) provided in the gas outlet or/and between the upper end of the tubular body and the container wall. Gas can alternatively be directed from the annular space to the gas outlet through a suitable line which can direct the gas directly to the gas outlet or for instance to the downstream side of a spin element. With a separate line for directing gas from the annular space to the gas outlet, directly or indirectly, the annular space can moreover be blocked towards the gas outlet. In addition to the fluid path for gas from the annular space to the gas outlet from the container, a fluid path for liquid from the annular space to the liquid outlet from the container is also provided. The container can be vertical (upright) or horizontal (lying down), or the separation device may be arranged in a pipe/tube, where the container may be a pipe section. The terms container and pipe section are used interchangeably where this is found appropriate. Several tubular bodies can be arranged in a container or pipe section, in parallel or in series, wherein a container or pipe section can contain several or all tubular/pipe bodies or separate containers, or pipe sections can be arranged around each tubular body. Flow manifolds can be arranged separately for each tubular body, or a flow manifold can be arranged to several tubular bodies. By the term annular space is meant the space outside the tubular body or tubular bodies, and even if the mentioned space in most embodiments of the invention may be annular formed, there may also be embodiments with annular space consisting of the space outside several tubular bodies in parallel. The annular space receives gas flowing through the porous wall of the tubular body, and the received gas is flowing directly or via other paths out of the annular space and out through the gas outlet from the container or the pipe section. Separation devices can be arranged in series or in parallel, in which the latter can be advantageous in the case of pipes or containers with large cross section. Terms such as vertical, circular, axial or vertical upright is not to be interpreted literary or exactly, in that deviations are allowed as long as the intended function is maintained.

The separation device is preferably arranged so that a main part of the gas flow or the inlet flow is directed through the central opening of the pipe section (the tubular body), while a smaller part of the gas flow is directed through the porous wall in the pipe section.

Gas flow through the pipe wall, capillary forces and absence of surfaces for forming liquid film will direct liquid accumulating on the inner surface of the tubular body into the tubular body, and due to limited gas flow through the pipe wall the liquid will be directed through the pipe wall down into the bottom of the container while the gas will flow to the gas outlet. The separation device is preferably formed such that a minimum of 80% of the gas flow will be directed through the central opening in the pipe section while maximum 20% of the gas flow will be directed through the porous wall in the pipe section. Thus, the entrainment or re-tearing up of the already separated liquid is minimized.

The desired distribution of flow through the tubular body and flow through the pipe wall can be controlled by designing and controlling means. The porous tubular body is preferably designed as a conical pipe section with at least an opening in the upper part towards the outlet, the size of the opening being important in order to control the distribution of flow through the pipe opening or pipe wall. Preferably a valve, a choke disc or another control device in the upper part of the pipe section can be arranged, that is, in the upper end or downstream end seen along the gas flow direction, to adjust the part of the gas flow passing through the wall of the porous body. Preferably control means are also provided in the outlet for gas from the container, which also contributes to control the part of the gas flow flowing through the wall in the porous body.

The entire inner surface of the porous tubular body is preferably arranged such that liquid film is not deposited thereon, that is without surfaces where liquid film can be deposited. The porosity in the porous tubular body is preferably, and as far as it is feasible, of a so called open type, that is with penetrating, coherent openings. Advantageously the porous tubular body has open porosity up to its inner surface. In one embodiment the porosity is advantageously variable along the length of the porous body, preferably so that the porosity is largest, or the resistance against through-flow is lowest, in the bottom part of the porous body.

The flow distributor or manifold can have many different forms, but is advantageously a spin element, and is particularly preferably a separation device in itself, preferably in the form of the so-called spinlet. The spinlet is in itself a separation device for separating a liquid phase and any other component from a fluid flow which mainly comprises gas, the spinlet comprising: a fluid inlet either tangential oriented to the inner wall of the separate device or equipped with a deflection plate, such that entered fluid is aligned tangential horizontal or with some downward slope along the inner wall of the separation device, characterised in that the entered fluid is led into the fluid path arranged at a downward directed spiral inside the separation device, along its inner wall, from a level above or aligned with the inlet to a level aligned with or near the outlet for liquid, with opening for gas discharge along the fluid path in towards the centre of the separation devices, such that all fluid that has been directed into the fluid path is directed through the entire length of fluid path, with the exception of escaped gas. Details about Spinlet may be found in the Norwegian patent document NO 320 957 and in the corresponding, international patent publication WO 04030793, to which reference is made.

The separation device may in some embodiments preferably contain additional flow manifold, for instance an additional spin element, and preferably at the inlet of the porous tubular body, and in particular for embodiments with low flow rates, in order to enhance or maintain rotational flow.

The container can be portioned in an upper part in which the pipe or tubular body is positioned and the lower part in which the spin element is positioned in order to ensure that all gas is directed into the tubular body, where a fluid path for draining of liquid preferably is provided from the upper part to the lower part. Instrumentation and control devices of known type can be attached to the separation device.

The separation device according to the invention comprises preferably one or several of the above mentioned features in any combination, in order to enhance the technical efficiency.

BRIEF DESCRIPTION OF THE DRAWINGS

The present invention is illustrated by means of the figures, of which

FIG. 3 illustrates the underlying problem of the invention, and

FIG. 4 illustrates technical efficiency of the separation device according to the invention compared with a typical axial cyclone separator.

DETAILED DESCRIPTION OF THE PREFERRED EMBODIMENT(S)

Figure 1:
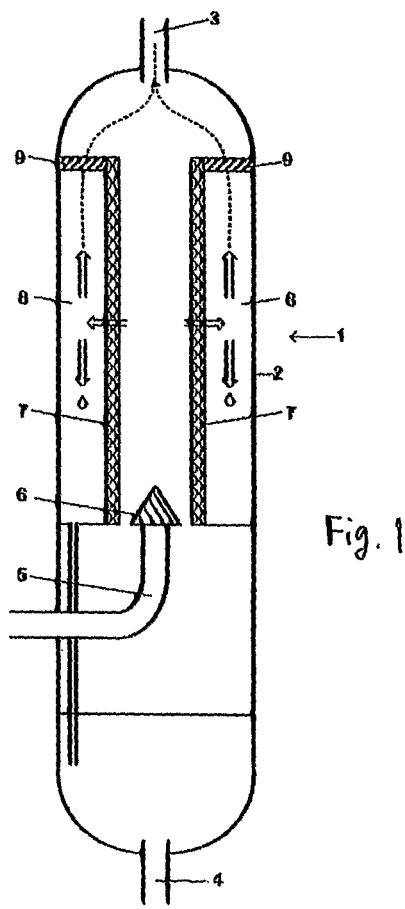
FIG. 1 illustrates a separation device according to the invention.

Reference is first made to FIG. 1 which illustrates separation device 1 according to the invention. The separation device comprises a mainly vertically standing container 2 with a mainly circular cross section, an outlet for gas 3 in the upper part of the container, an outlet for liquid 4 in the lower part of the container and an inlet 5 for the flow which mainly contains gas. Further the container comprises a spin element 6 provided in the end of the inlet 5, so that an inlet flow which mainly comprises gas is put into a rotational movement around the vertical axis of the container. Further a porous tubular body 7 formed as a pipe section is arranged in the container, around and above this spin element, where a part of the inserted/introduced rotating fluid flow in the tubular body is flowing through the opening in the pipe section, while the remaining of the rotating, inserted fluid flow is flowing through the porous wall of the tubular body to an annular space 8 between the container wall and a porous body. In the illustrated embodiment the separation device also comprises a wire mat 9 (wired mesh demister) arranged between the upper end of the tubular body and the container wall.

Figure 2:
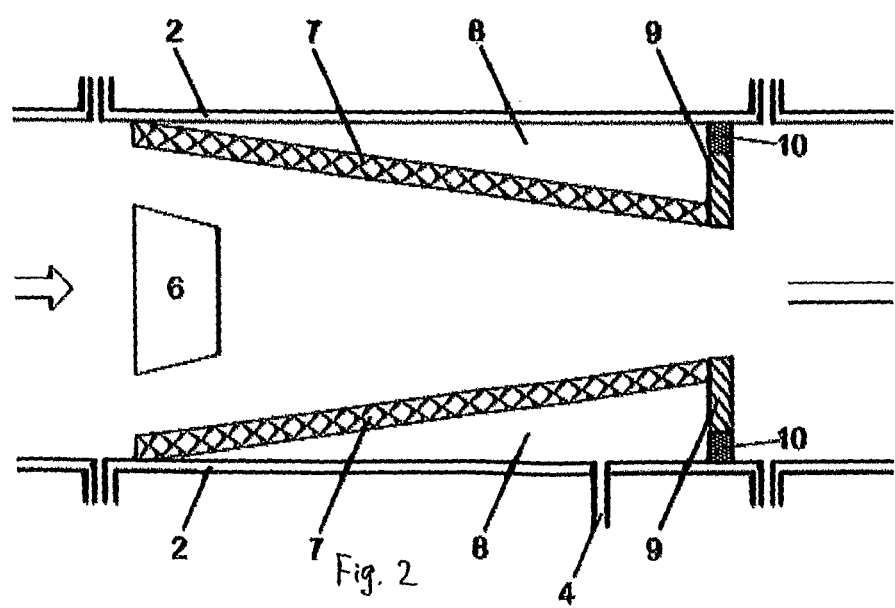
FIG. 2 illustrates a further separation device according to the invention.

FIG. 2 illustrates another embodiment of a separation device according to the invention. In particular the container comprises a tubular section 2, and the porous tubular body 7 is conically tapered or contracting. In order to collect liquid from the annular space 8, a internal flange 10 is provided in the tubular section. The flange 10 and the liquid outlet 4 may preferably be formed such as to prevent creep-flow of liquid and facilitates collecting and draining of liquid from the annular space. All the reference numerals refer generally to identical or equivalent features as for FIG. 1. FIG. 2 illustrates an in-line separation device which can be designed and constructed according to pipe code.

The arrangement of the porous pipe section is considered to be central in order to obtain the intended effect. Without a desire to be bound by theory, it is assumed that the surprisingly poor separation effect of known separators, particularly equipment for separation of small amounts of liquid from gas under conditions of high pressure and high rate, has to do with the accumulation of liquid film on the separator wall and that this liquid film easily is engaged by the gas flow at high pressure and high velocities. The effect is assumed to be strengthened by reduced interfacial surface tension between gas and liquid at increasing pressure, and the interfacial surface tension is in practice approaching 0 at very high pressure so that only one phase will exist at very high pressures.

The underlying problem of the invention is illustrated by means of FIG. 3 which shows the degree of efficiency of cyclone separation for a general axial flow cyclone separator, the so-called Verlaan-cyclone, with a liquid flow rate of 45 liter per hour to the cyclone. Along the y-axis the separation efficiency degree is given in %, along x-axis the gas velocity in meter per second is given vertically (along the z-axis) in the separator (Superficial Gas Velocity). Measurement data exist with nitrogen as gas phase and Exxol D60 as liquid phase, as well as a natural gas fluid system comprising methane, ethane and penthane. From FIG. 3 it will clearly appear that the separation efficiency decreases with increasing pressure, and that the separation efficiency decreases with increasing velocity. In FIG. 4 is shown comparison data for a general axial flow cyclone separator and the separation device according to the invention with fluid contents of 0.022-0.030 volume %. Along the axis are given corresponding parameters as for FIG. 3. From FIG. 4 it will clearly appear that the separation efficiency for the separation device according to the invention is considerably better for the entire test range, and particularly by increasing velocity, in that the curve obtained with the separation device according to the invention is considerably higher with respect of the separation efficiency degree. It is assumed that the benefits and the difference will increase even more by increasing pressure.

The invention claimed is:

1. Separation device for separation of liquid from an inlet flow which mainly comprises gas, wherein the separation device comprises a container or pipe section with an outlet for gas from the container or pipe section, an outlet for liquid from the container or the pipe section, and an inlet for the inlet flow to the container or pipe section, wherein the separation device further comprises:

a flow distributor arranged to receive and put the inlet flow in movement towards a porous tubular body extending towards the gas outlet and arranged to receive all or mainly the whole of the inlet flow, wherein a part of the said flow is flowing through the tubular body to the gas outlet while the remaining of said flow is flowing through the porous wall of the tubular body, and an annular space consisting of the volume between the annular body and the container wall or pipe section, said annular space is open for gas flow towards the gas outlet.

2. Separation device according to claim 1 to separate liquid from an inlet flow which mainly contains gas, the separation device comprising a vertical standing container with circular cross-section, an outlet for gas in an upper part of the container, an outlet for liquid in a lower part of the container, and an inlet for the inlet flow, wherein the separating device further comprises:

a spin element arranged to receive and put the inlet flow in rotational movement around the vertical axis of the container, a porous tubular body extending towards the gas outlet and arranged to receive the whole or mainly the whole of the rotating inlet flow, wherein a part of said rotating is flowing flows through the tubular body to the gas outlet while the remaining of said rotating flow is flowing through the porous wall of the tubular body, and an annular space consisting of a volume between the tubular body and the container wall, said annular space is upwardly open towards the gas outlet.

3. Separation device according to claim 1, wherein the porous tubular body is formed as a conical pipe section with minimum diameter in the upper end towards the gas outlet.

4. Separation device according to claim 1, wherein a minimum of 80% of the gas flow is directed through the pipe opening, while maximum 20% of the gas flow is directed through the porous pipe wall.

5. Separation device according to claim 1, wherein the flow distributor is a separation device itself.

6. Separation device according to claim 1, wherein the inside of the porous tubular body has no surfaces where liquid film can be deposited, wherein the porous tubular body have open porosity completely up towards its inner surface.

7. Separation device according to claim 1, further comprising a wire mat arranged in the gas outlet and/or between the upper end of the tubular body and the container wall.

8. Separation device according to claim 1, further comprising a spin element in the form of a spinlet arrangement, and in addition a spin element in each inlet end of the tubular body, wherein several tubular bodies are arranged in parallel in a container.

9. Separation device according to claim 1, wherein a partition is arranged between an upper and a lower part of the container so that the porous tubular body is situated in the upper part while the spin element is situated in the lower part.

10. Separation device according to claim 1, wherein the porous body has variable porosity, so that the porosity is largest in the lower part of the body where the resistance against through flow thus is lowest.

11. Separation device according to claim 1, further comprising an adjusting/control arrangement in the upper end of the tubular body.

12. Separation device according to claim 5, wherein the flow distributor is a spinlet.

13. Separation device according to claim 7, wherein the wire mat is a wired mesh demister.

* * * * *